(12) United States Patent
Poiesz et al.

(10) Patent No.: US 9,875,242 B2
(45) Date of Patent: Jan. 23, 2018

(54) DYNAMIC CURRENT RESULTS FOR SECOND DEVICE

(71) Applicant: Google Inc., Mountain View, CA (US)

(72) Inventors: Benjamin David Poiesz, Santa Clara, CA (US); Andrew Abramson, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 385 days.

(21) Appl. No.: 14/294,179

(22) Filed: Jun. 3, 2014

(65) Prior Publication Data

US 2015/0347407 A1 Dec. 3, 2015

(51) Int. Cl.
*G06F 17/30* (2006.01)
*G06F 7/00* (2006.01)

(52) U.S. Cl.
CPC .... *G06F 17/30017* (2013.01); *G06F 17/3053* (2013.01); *G06F 17/30247* (2013.01); *G06F 17/30864* (2013.01)

(58) Field of Classification Search
CPC ........ G06F 17/30864; G06F 17/30247; G06F 17/30026; G06F 17/30047; G06F 17/30029
See application file for complete search history.

(56) References Cited

U.S. PATENT DOCUMENTS

| 6,266,664 B1 * | 7/2001 | Russell-Falla .... G06F 17/30867 707/700 |
| 7,039,699 B1 * | 5/2006 | Narin ..................... G06Q 30/02 709/207 |
| 8,516,528 B2 | 8/2013 | Sandoval et al. |
| 8,656,264 B2 | 2/2014 | Newman et al. |
| 8,799,401 B1 * | 8/2014 | Bryar ................ G06F 17/30253 709/217 |
| 2005/0071741 A1 * | 3/2005 | Acharya ........... G06F 17/30864 715/208 |
| 2005/0240580 A1 * | 10/2005 | Zamir ............... G06F 17/30867 707/4 |
| 2008/0092164 A1 * | 4/2008 | Agarwal ............ H04N 7/17318 725/40 |
| 2008/0183672 A1 * | 7/2008 | Canon ............... G06F 17/30905 707/3 |

(Continued)

FOREIGN PATENT DOCUMENTS

| EP | 2388721 A1 | 11/2011 |
| WO | WO-2009100093 A1 | 8/2009 |

(Continued)

OTHER PUBLICATIONS

International Preliminary Report on Patentability dated Dec. 15, 2016 as received in Application No. PCT/US2015/032421 7 pp.

(Continued)

*Primary Examiner* — Marc Somers
(74) *Attorney, Agent, or Firm* — Morris & Kamlay LLP

(57) ABSTRACT

Systems, device and techniques are disclosed for providing at least one dynamic current result to a second device, such as a mobile phone, where the at least one dynamic current result is related to content that is active on a first device such as a television. The dynamic current result may be generated based on a search query.

21 Claims, 5 Drawing Sheets

(56) References Cited

U.S. PATENT DOCUMENTS

| | | | |
|---|---|---|---|
| 2011/0289098 A1* | 11/2011 | Oztaskent | G06F 17/30026 707/769 |
| 2011/0289532 A1* | 11/2011 | Yu | H04N 21/4126 725/38 |
| 2011/0307786 A1 | 12/2011 | Shuster | |
| 2012/0251011 A1* | 10/2012 | Gao | G06F 17/30265 382/224 |
| 2012/0323908 A1* | 12/2012 | Herbert, Jr. | G06F 17/30864 707/728 |
| 2013/0198642 A1* | 8/2013 | Carney | G06F 3/0484 715/738 |

FOREIGN PATENT DOCUMENTS

| | | |
|---|---|---|
| WO | WO-2010054222 A1 | 5/2010 |
| WO | 2013103584 | 7/2013 |

OTHER PUBLICATIONS

International Written Opinion and Search Report dated Aug. 19, 2015 as received in Application No. PCT/US2015/032421 9 pp.

\* cited by examiner

DYNAMIC CURRENT RESULTS FOR SECOND DEVICE

BACKGROUND

The increase in second devices such as mobile phones, tablets, laptops, and the like has led to increased activity on the second device while being exposed to content on a first device. As an example, users that view a movie on their television tend to also be actively using their mobile phones. Often, a user that is exposed to content via a first device uses their second device to search for information related to the content on the first device. As an example, a user may watch a movie on their television, the movie starring an actor W. The user may decide to use her mobile phone to look up awards won by actor W while watching the movie.

BRIEF SUMMARY

According to implementations of the disclosed subject matter, a content fingerprint for a currently active content on a first device may be received. The content fingerprint may be correlated to a database entry in a known content database and a search query may be generated based on the database entry. A dynamic current result based on the generated search query may be received and the dynamic current result may be provided on the second device. The dynamic current result may be provided by a search engine, a content service, a knowledge base, or the like and may be based on the analysis of one or more website, forum, social media outlet, application or the like. The dynamic current result may be based on a search frequency, search recency, trend of search, update frequency, update recency, user history or user selections.

According to implementations of the disclosed subject matter, a means to receive a content fingerprint for a currently active content are provided, where the content fingerprint is correlated to a database entry in a known content database. A search query may be generated based on the database entry and a dynamic current result may be received based on the generated entry. The dynamic current result may be provided by a search engine, a content service, a knowledge base, or the like and may be based on the analysis of one or more website, forum, social media outlet, application or the like. The dynamic current result may be based on a search frequency, search recency, trend of search, update frequency, update recency, user history or user selections. Means may be provided for providing the dynamic current result on a second device.

Systems and techniques according to the present disclosure allow dynamic current results to be provided to a second device. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
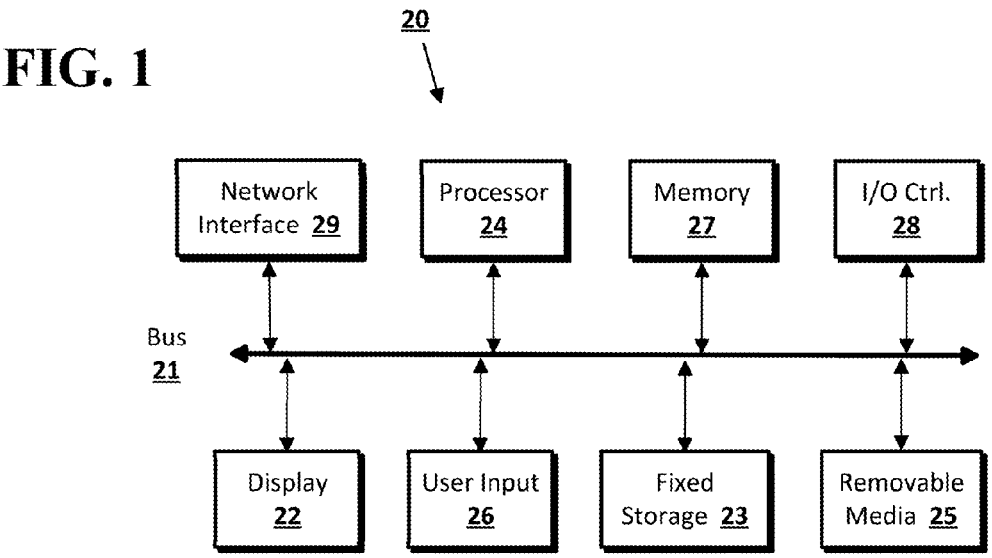
FIG. 1 shows a computer according to an implementation of the disclosed subject matter.

Techniques disclosed herein enable a second device (e.g., a mobile device such as a mobile phone, tablet, laptop, etc.) to receive dynamic current results that are related to content that is output on a first device (e.g., a television, monitor, speakers, etc.). As an example, a user may view a television special about a baseball team B. The user may be provided with a message on her mobile device, the message providing information about the recent acquisition of a baseball player P by the team B. Dynamic current results may include content that a user that is exposed to content on the first device may be interested in. Examples of dynamic current results include information about actors, directors, producers, or the like that are associated with the content on a user's television screen. Other examples include facts about content, historical notes about the content, current events associated with the content or persons associated with the content, or the like. Notably, an individual may receive currently relevant results (dynamic current results) on her second device without interrupting exposure of content via the first device. As an example, providing dynamic current results to a user may cause a user to receive a first set of results the first time the user views a given movie and a second, different, set of results the second time the user views the same given movie.

The dynamic current result provided to the second device may be based on the content that is active on a first device. As shown in the previous example, the recent acquisition of the baseball player P by team B is based on the user viewing a television special about team B. As disclosed herein, a content fingerprint related to a currently active content may be received. Continuing the example, the content fingerprint for the television special may be a program ID corresponding to the television special about team B. The content fingerprint may be correlated to a database entry in a known content database. Continuing the previous example, the program ID for the television special may be matched with an entry in the known content database, the entry containing information about the topic of the special, the actors, related individuals, and related teams. A search query may be generated based on the database entry. The search query may be a keyword search query or a non-keyword search query and may include requesting data related to the information contained in the database entry (e.g., topic of the content, the actors, related individuals, and related organizations, etc.). A dynamic current result may be received based on the generated query and the dynamic current result may be provided via a second device. A dynamic current result may be provided by a search engine, a content service, or a knowledge base such that the dynamic current result is not simply looked up in a table. Rather, the dynamic current result is obtained as a result of a current query made such that the dynamic current result for a subsequent query may be different than the result from a current query. A dynamic current result may be based on various factors, as disclosed herein.

Figure 3:
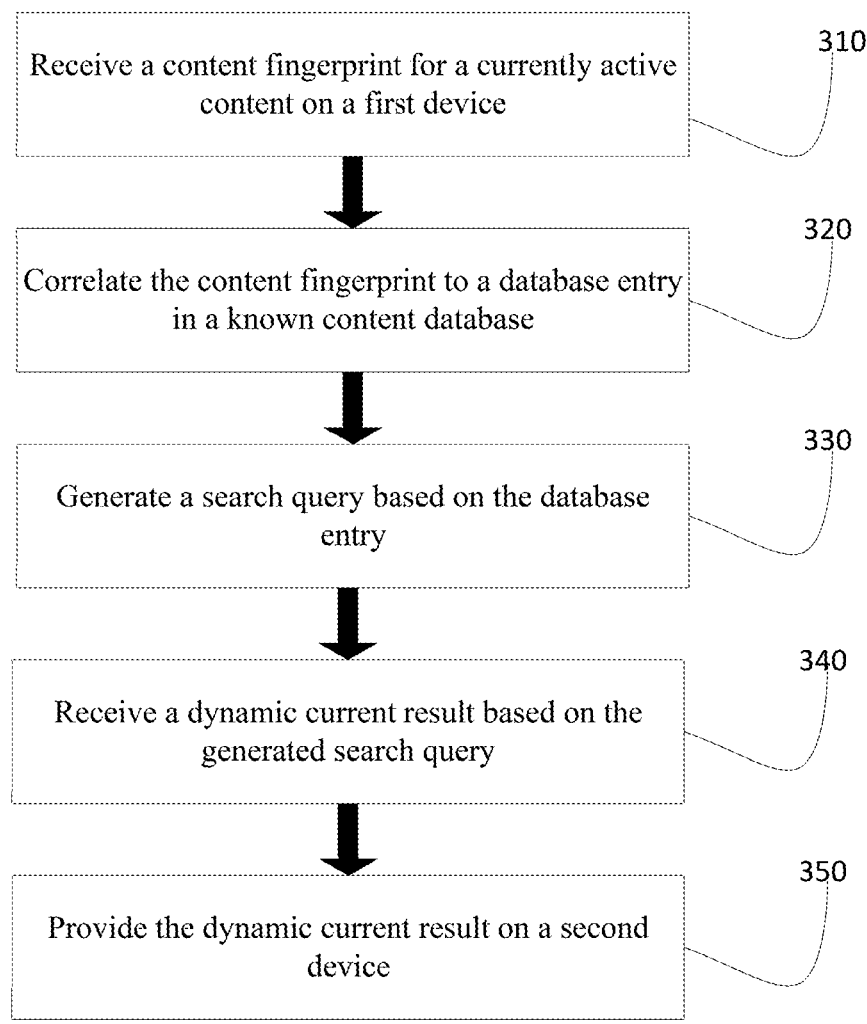
FIG. 3 shows an example process for providing dynamic current results, according to an implementation of the disclosed subject matter.

According to an implementation of the disclosed subject matter, as shown at 310 in FIG. 3, a content fingerprint for a currently active content, on a first device, may be received. The content fingerprint may be received by a component of the first device itself, an external component external to the first device, a server, a database, a cloud component, or a second device.

A currently active content on a first device may be any media content (e.g., audio, visual, text) that is being output by the first device. A currently active content may be a song, an audio book, an instrumental track, a speech, a video clip, a music video, a television show, a movie, an advertisement, a documentary, a caption, a text, or the like. As an example, a movie may be playing on a television screen.

A content fingerprint may be an audio fingerprint, a video fingerprint, a title, a caption track, a content ID, or the like. An audio fingerprint may be based on a portion of the currently output audio. For example, an audio fingerprint may correspond to a portion of a dialogue by an actor in a movie. Alternatively, for example, an audio fingerprint may correspond to background music in a television show. A video fingerprint may be based on a portion of the currently output video. For example, a video fingerprint may correspond to a scene in a movie. A content ID may a unique ID associated with a currently output content. As an example, the content ID associated with a given movie may be #FATF6. A content fingerprint may be provided by the first device, determined by the first device, determined by an external component external to the first device, a server, a database, a cloud component, or a second device. A content fingerprint may correspond to the entire currently output content (e.g., a content ID for a movie) or may correspond to a current position in the currently active content. A current position may be a subset of the currently output content such as a frame, a scene, a portion, a timestamp, a time range, or the like. As an example, a user may view a two hour movie on her television. A content fingerprint may be received at the one hour mark and may be specific to the one hour mark (e.g., a video fingerprint for a scene that occurs at the one hour mark).

According to an implementation of the disclosed subject matter, as shown at 320 in FIG. 3, the content fingerprint may be correlated to a database entry in a known content database. A known content database may contain information associated with multiple content fingerprints. As an example, a content database may contain information associated with 5000 movies, 100000 video finger prints, 3000 television shows, 20000 songs, and 10000 books. A content database may contain multiple content fingerprints for the same content. As an example, a content database may contain 100 video fingerprints for a given movie. A content fingerprint may be correlated to a database entry in any applicable manner such as an exact match to a database entry, a similarity to a database entry (e.g., a match within a given threshold), or the like. As an example, a content fingerprint may be a content ID #FATF6 which may correlate to a database entry containing the content ID #FATF6. A database entry may contain information associated with the content which corresponds to the database entry. The information may include a title, an actor, an author, associated entities, a time period (e.g., the 60s), a genre, or the like.

As an example of correlating a content fingerprint to a database entry, a content fingerprint for a currently active movie may be an audio fingerprint at the 1 hour and 43 minute mark of a movie. The audio fingerprint may be matched with a database entry #43243 such that the audio fingerprint at the 1 hour and 43 minute mark of the currently active movie may have a 99% match with the information in the database entry. The database entry may contain the actor's name and the movie title.

According to an implementation of the disclosed subject matter, as shown at 330 in FIG. 3, a search query may be generated based on a database entry. A search query may be based on the information contained within the database entry. Continuing the pervious example, a search query may be based on the actor's name and/or the movie title. A search query may be any applicable query that searches an updatable database and/or returns dynamic current results, as disclosed herein. A search query may be based one or more keywords generated from the information contained in a database entry or may be generated from an event associated with the information contained in a database entry. As an example of an event associated with information contained in a database entry, a database entry may contain information about a crowd as well as a basketball game related to a given scene in a movie. A search query may be generated, the search query seeking results for championship games.

According to an implementation of the disclosed subject matter, as shown at 340 in FIG. 3, a dynamic current result may be received based on the search query. The dynamic current result may be provided by a search engine, a content service, a knowledge base or the like. For example, a search engine provided dynamic current result may be obtained from a search engine that receives the search query and applies a search technique to identify results in response to the search query. The results provided by the search engine, content service, or knowledge base may be dynamic such that a result for a given search query at a first time may be different than if the search query is submitted at a second time. Essentially, a dynamic current result may be one that is not simply looked up in a lookup table but, rather, is provided based on a current search that is conducted at or about the time that a user views the related content on the first device. A content service may be any service configured to provide content (e.g., media, news, entertainment, sport, etc.). As an example, a content service may be a media content provider that provides various media content (e.g., movies, TV shows, documentaries, etc.) to users that subscribe to the content service. The content service may be configured to respond to queries and/or to make recommendations based on user preferences or history. A knowledge base may be contain or use semantic-search information gathered from various sources. A knowledge base may enable users to use the information contained in the knowledge base to resolve queries without having to navigate to other sources and assemble information themselves.

A dynamic current result provided by a search engine, content service, knowledge base, or the like may be based on the analysis of a website, forum, social media outlet, application, or the like.

The analysis may be based on a search frequency, search recency, trend or search or the like. As an example of search frequency, a search threshold may be used to determine whether a given content should be provided as a dynamic current result. If the number of searches that result in the given content exceeds, for example, 30 hits per hour, then the content may be eligible to be provide as a dynamic current result. As an example of a search recency, a recency threshold may be used to determine whether a given content should be provided as a dynamic current result. If the number of searches within a given amount of time, for example, the past 30 minutes, exceeds 5 searches, then the content may be provided as a dynamic current result. As an example of a trend in search, a trend threshold may be used to determine whether a given content should be provided as a dynamic current result. If the change in number of searches for a given content is above, for example, 4 searches an hour such that for a first hour there may be 10 searches and for a subsequent hour there may be 14 searches (i.e., an increase of 4 searches per hour), then the content may be provided as a dynamic current result.

The analysis may be based on an update frequency or an update recency. As an example of an update frequency, an update frequency threshold may be used to determine whether a given content should be provided as a dynamic current result. If the amount of times that a given content or content host (e.g., website, forum, social media outlet, application, etc.) has been updated within a time period such that the amount of times exceeds the update threshold then the content may be eligible as a dynamic current content. As a more specific example, if the update threshold is 3 updates a day and the number of times a given content host is updated is 4 times in a day, then the content on the content host may be eligible to be provided as a dynamic current result. As an example of an update recency, an update recency threshold may be used to determine whether a given content should be provided as a dynamic current result. If the recency that a given content or content has been updated within a time period such that the time the content or content host was updated is below the threshold, then the content may be eligible as a dynamic current content. As a more specific example, if the update threshold is 3 hours and content host is updated 2 hours prior to a current time, then the content on the content host may be eligible to be provided as a dynamic current result.

A dynamic current result may be based on one or more user selections or based on a user's historical usage. A user selection may be the selection of content by a user via any device such as the user's mobile phone, tablet, laptop, desktop, television, set top box, or the like. As an example, a user may be viewing a first content on her television at a first time. Based on the user's viewing, she may be provided with information, on her phone, about the actors on the television. The user may select the content on her phone. Based on the selection, subsequent content that correspond to actors within a content may be candidates for dynamic current content as the user may be more likely to select this category of content during future use. A user's historical usage may correspond to a user's search history, preferred content, profile, or the like. As an example, a user may frequently visit websites about historical events. Based on this information, content that corresponds to historical events may be a candidate for dynamic current result.

A dynamic current result may be based on a user type. A user type may correspond to a user demographic, a user experience, a user skill level or the like. As an example, a user type may be based on the user's being a highly technological user. Based on this designation, content that requires a user to interact in a technological manner may be a candidate for a dynamic current content. More specifically, for example, a content may require a user to change her mobile phone settings from silent to loud in order to experience the content. If a user type for the user is determined to be a highly technological user, then that content may be a candidate for a dynamic current result.

According to an implementation of the disclosed subject matter, a dynamic current result may be selected based on the selection of the dynamic current result by one or more other users. The selection of the dynamic current result by one or more other users may indicate that users of a media item are generally interested in that dynamic current result while viewing the media item or portion of the media item. As an example, a user A may be provided with a button to view the biography for an actor that is currently on her television screen. User A may select the button and view the biography. A user B may be viewing the same scene on her television screen and may be provided with a button to view the same biography of the same actor, based on the selection of the button by user A. Similarly, the selection of a dynamic current result by a user may result in updating a database such that the dynamic current result is more likely to be provided to a subsequent user that views the same content.

According to an implementation of the disclosed subject matter, a safety rating of a dynamic current result may be determined and the dynamic current result may only be provided to a user if the safety rating is below a safety threshold. The safety threshold may be set by a user or may be determined based on a user's age or preferences. As an example, a parent may set the safety threshold on her child's phone to be a secure threshold. A dynamic current result containing profanity may be identified as a candidate result to be provided to the user. However, the safety rating of the dynamic current result may be determined to be unsecure. Accordingly, the dynamic current result containing the profanity may not be provided to the child.

According to an implementation of the disclosed subject matter, a user may opt to be exposed to dynamic current results. A user may opt to be exposed to dynamic current results by selecting an option on the user's device, requesting dynamic current content, or the like. As an example, a user may access a settings menu on her mobile device and select a button corresponding to receiving dynamic current results on the mobile device. Based on a user opting to be exposed to dynamic current results, a database may be updated such that dynamic current results are provided to the user based on the database entry.

It will be understood that although various techniques of electing a dynamic current result are provided herein, two or more techniques may be combined to select a dynamic current to provide to a user. As an example, both recency of update and update frequency may be used to determine which dynamic current content is to be provided to a user. More specifically, according to this example, a content that only meets the threshold for update recency may not be provided to a user if the same content does not also meet the update frequency threshold.

According to implementations of the disclosed subject matter, as shown at step 350 in FIG. 3, a dynamic content result may be provided to a user on a second device. The second device may be any device that is distinct from the device that outputs a media content. As an example, if a user is viewing a movie on her television, the second device may be a mobile phone, tablet, laptop, computer, external screen, or the like. A second device may be any device that a user has access to while being exposed to content on a first device such that receiving dynamic current content on the second device does not directly interfere with the user being exposed to content on the first device.

Figure 4A:
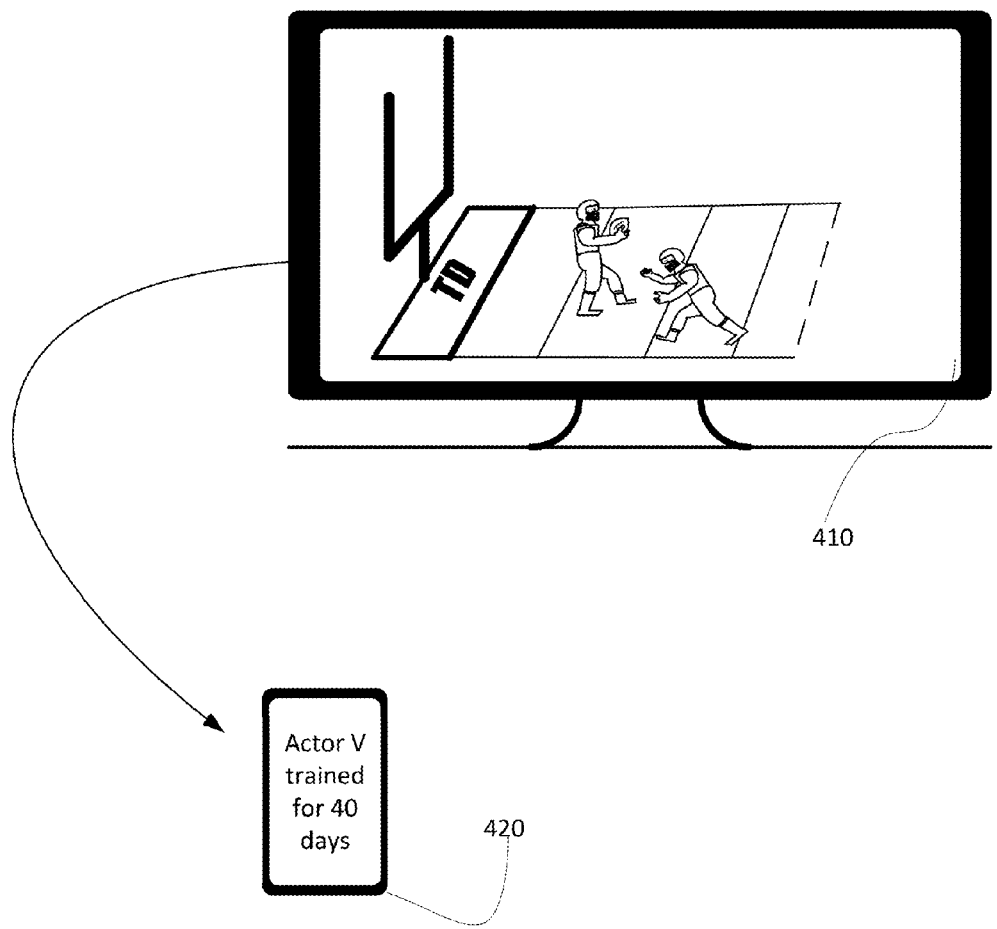
FIG. 4a shows an example illustration of a first and second device, according to an implementation of the disclosed subject matter.

According to an implementation of the disclosed subject matter, dynamic content to provide to a user on a second device may be determined by either the first device or the second device. The first or second device may have access to the dynamic content via accessing a storage, a database, a network, a cloud entity, or the like. In an illustrative example, as shown in FIG. 4a, a television 410 may be a first device that displays a football movie and a mobile phone 420 may be a second device that displays dynamic current content associated with the movie. According to this example, the television 410 may receive a content fingerprint for a currently active scene in the movie, correlate the content fingerprint to a database entry in a known database, that the television 410 has access to, generate a search query based on the database entry, and receive a dynamic current result based on the generated search query. The television 410 may provide the dynamic current result to the mobile phone 420. Alternatively, the mobile phone 420 may receive a content fingerprint for a currently active scene in the movie that is provided via the television 410, correlate the content fingerprint to a database entry in a known database, that the mobile phone 420 has access to, generate a search query based on the database entry, and receive a dynamic current result based on the generated search query. The mobile phone 420 may provide the dynamic current result via, for example, a screen or a speaker.

Figure 4B:
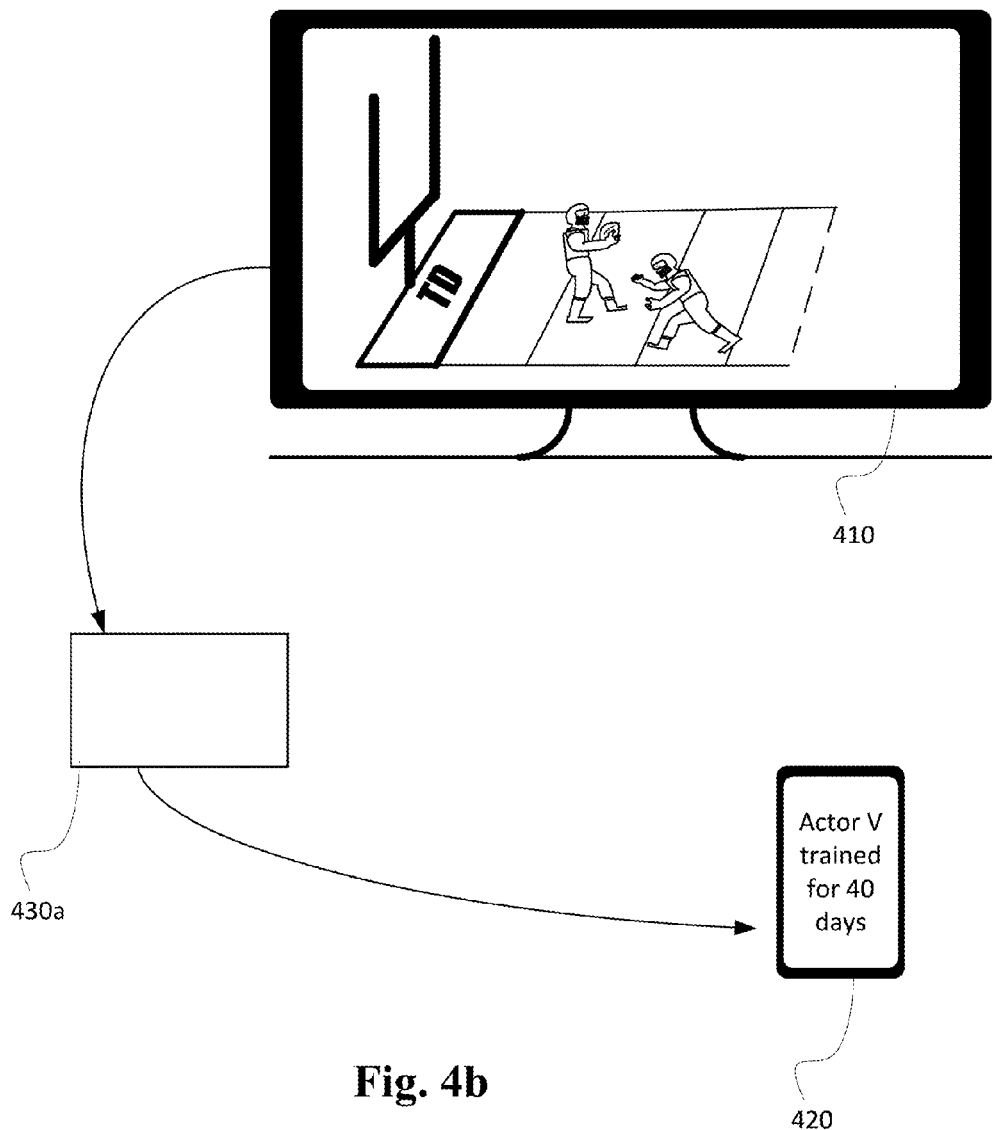
FIG. 4b shows another example illustration of a first and second device, according to an implementation of the disclosed subject matter.
Figure 4C:
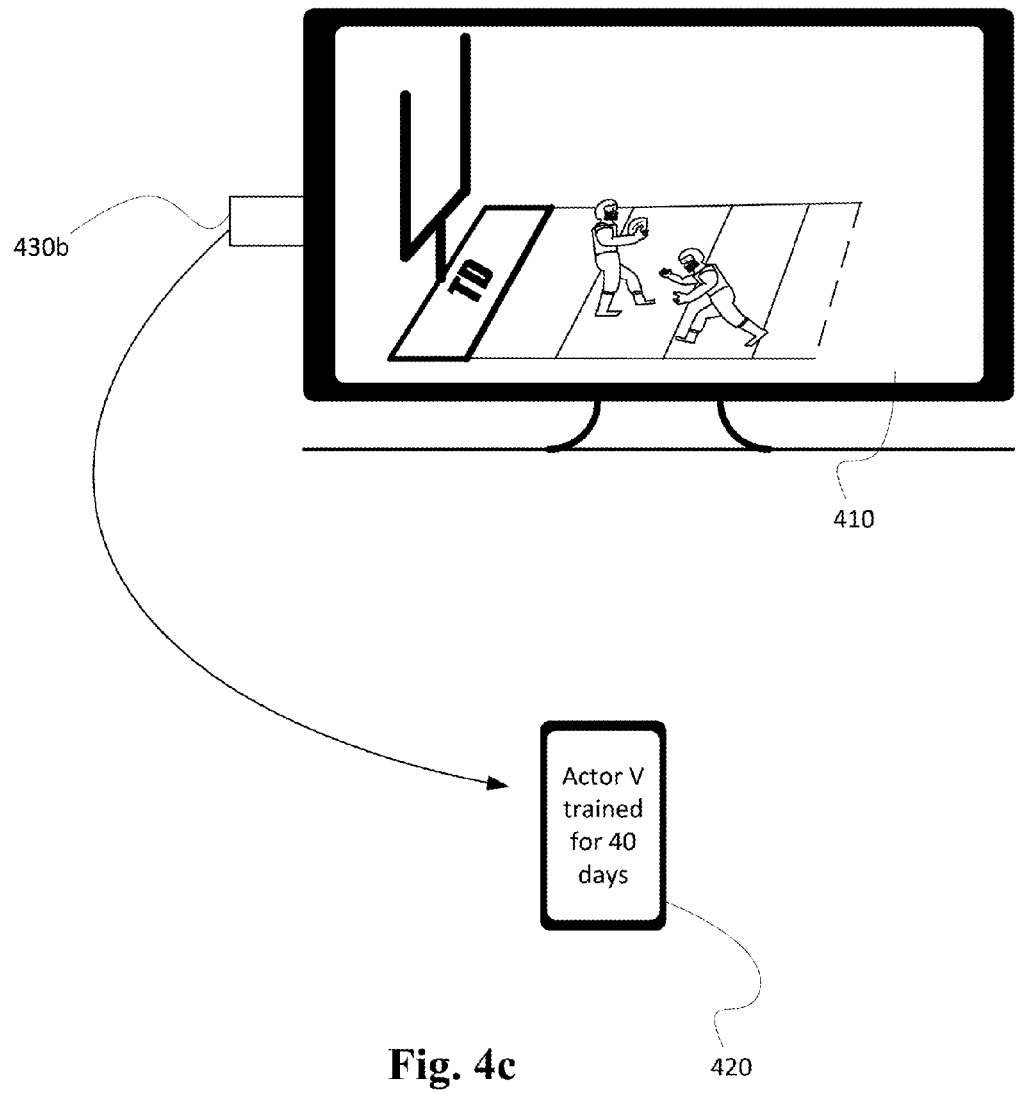
FIG. 4c shows another example illustration of a first and second device, according to an implementation of the disclosed subject matter.

According to an implementation of the disclosed subject matter, dynamic content to provide to a user on a second device may be determined all or in part by an external device. The external device may have access to the dynamic content via accessing a storage, a database, a network, a cloud entity, or the like. In an illustrative example, as shown in FIG. 4b and FIG. 4c, a television 410 may be a first device that displays a football movie and a mobile phone 420 may be a second device that displays dynamic current content associated with the movie. An external device may either be directly connected to either the first device 410 (as shown in FIG. 4c by 430b) or the second device 420. Alternatively, the external device may not be directly connected to either the first device 410 or second device 420 (as shown in FIG. 4b by 430a). According to this example, the external device, 430a or 430b, may receive a content fingerprint for a currently active scene in the movie, correlate the content fingerprint to a database entry in a known database, that the external device, 430a or 430b, has access to, generate a search query based on the database entry, and receive a dynamic current result based on the generated search query. The external device 430a or 430b may provide the dynamic current result to the mobile phone 420.

Implementations of the presently disclosed subject matter may be implemented in and used with a variety of component and network architectures. As an example, a transmitter or a receiver may be controlled using the computer or network architectures disclosed herein. As another example, a transmitter may be used to charge a computer or network device, as disclosed herein. FIG. 1 is an example computer 20 suitable for implementing implementations of the presently disclosed subject matter. A smart power device may implement a computer architecture as disclosed here or may apply any applicable architecture to accomplish the disclosed techniques. The computer (e.g., microcomputer) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
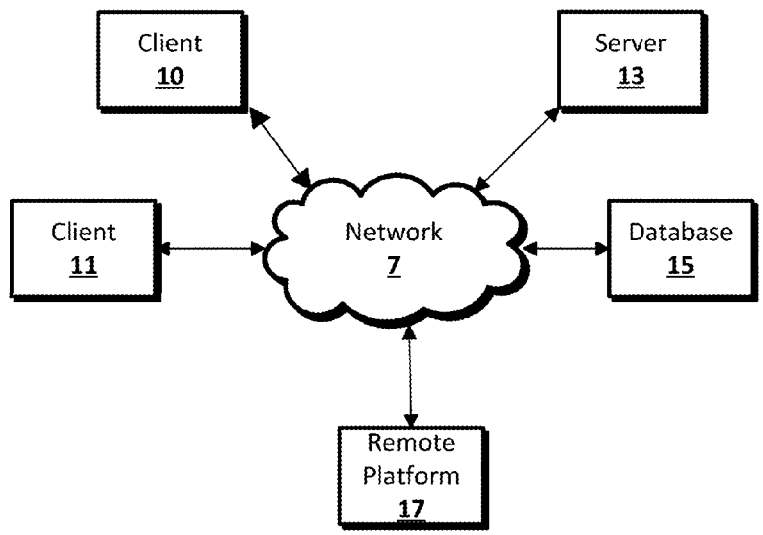
FIG. 2 shows a network configuration according to an implementation of the disclosed subject matter.

FIG. 2 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, at a processor, a content fingerprint for a currently active content on a first device;
correlating, at the processor, the content fingerprint to a database entry in a known content database;
generating, at the processor, a first search query based on the database entry;
receiving, at the processor, a first dynamic current result based on the generated first search query;
providing, by the processor, the first dynamic current result on a second device;
generating, at the processor, a second search query and receiving, at the processor, a second dynamic current result that is provided to the second device that is different from the first dynamic current result in response to the currently active content being presented on the first device a second time; and
providing, based on an update frequency threshold, a given content as the first dynamic current result or the second dynamic current result based on when an amount of times the given content or a content host that is communicatively coupled to the processor is updated within a time period exceeds the update frequency threshold.

2. The method of claim 1, wherein the content fingerprint corresponds to a current position of the currently active content.

3. The method of claim 2, wherein the current position is one selected from the group consisting of: a frame, a scene, a portion, a timestamp, and a time range.

4. The method of claim 2, wherein the content fingerprint is one selected from the group consisting of: an audio fingerprint, a video fingerprint, a title, a caption track, and a content identifier (ID).

5. The method of claim 1, correlating the content fingerprint to a database entry comprises matching at least a portion of the content fingerprint to at least a portion of the database entry.

6. The method of claim 1, wherein generating the first or second search query comprises generating one or more keywords associated with the database entry.

7. The method of claim 1, wherein generating the first or second search query comprises generating one or more events associated with the database entry.

8. The method of claim 1, wherein the first or second dynamic current result is provided by one selected from the group consisting of a search engine, a content service, and a knowledge graph.

9. The method of claim 1, wherein the first or second dynamic current result is based on an analysis of at least one selected from the group consisting of:
a website, a forum, a social media outlet, and an application.

10. The method of claim 1, wherein the first or second dynamic current result is based on at least one selected from the group consisting of: a search frequency, a search recency, and a trend of search.

11. The method of claim 1, wherein the first or second dynamic current result is based on an update recency.

12. The method of claim 1, wherein the first or second dynamic current result is based on user selections.

13. The method of claim 1, wherein the first or second dynamic current result is based on a user's historical usage.

14. The method of claim 1, wherein the first or second dynamic current result is based on at least another user's selection of the dynamic current result.

15. The method of claim 1, further comprising:
receiving a selection of the first or second dynamic current result from a user;
updating a database based on the selection; and
providing the first or second dynamic current result to another user based at least on the selection of the first or second dynamic current result from the user.

16. The method of claim 1, further comprising:
associating a user type with a user of the first and/or second device;

receiving the first or second dynamic current result based on the user type.

17. The method of claim 1, further comprising:
determining a safety rating of the first or second dynamic current result; and
providing the first or second dynamic current result if the safety rating is below a safety threshold.

18. The method of claim 1, further comprising:
determining that a user opts to be exposed to the provided first or second dynamic current result during output of a currently active content; and
updating a database based on the determination.

19. The method of claim 18, wherein the updated database provides a subsequent dynamic current result based on a subsequent query.

20. A system comprising:
a memory with instructions;
a processor, coupled to the memory, configured to:
receive a content fingerprint for a currently active content on a first device;
correlate the content fingerprint to a database entry in a known content database;
generate a first search query based on the database entry;
receive a first dynamic current result based on the generated first search query;
provide the first dynamic current result on a second device;
generate a second search query, and receive a second dynamic current result that is provided to the second device that is different from the first dynamic current in response to the currently active content being presented on the first device a second time;
provide, based on an update frequency threshold, a given content as the first dynamic current result or the second dynamic current result based on when an amount of times the given content or a content host that is communicatively coupled to the processor is updated within a time period exceeds the update frequency threshold.

21. A non-transitory computer readable medium that includes instructions that, when executed by a computer, performs the method of:
receiving, at a processor, a content fingerprint for a currently active content on a first device;
correlating, at the processor, the content fingerprint to a database entry in a known content database;
generating, at the processor, a first search query based on the database entry;
receiving, at the processor, a first dynamic current result based on the generated first search query;
providing, by the processor, the first dynamic current result on a second device;
generating, at the processor, a second search query and receiving, at the processor, a second dynamic current result that is provided to the second device that is different from the first dynamic current result in response to the currently active content being presented on the first device a second time; and
providing, based on an update frequency threshold, a given content as the first dynamic current result or the second dynamic current result based on when an amount of times the given content or a content host that is communicatively coupled to the processor is updated within a time period exceeds the update frequency threshold.

* * * * *